(12) United States Patent
Kawada

(10) Patent No.: US 6,574,337 B1
(45) Date of Patent: Jun. 3, 2003

(54) ADAPTIVE ECHO CANCELER UNDOING ADAPTATIONS MADE DURING DOUBLE-TALK

(75) Inventor: Shinichi Kawada, Tokyo (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 0 days.

(21) Appl. No.: 09/395,568

(22) Filed: Sep. 14, 1999

(30) Foreign Application Priority Data

Nov. 16, 1998  (JP) ............................................. 10-324865

(51) Int. Cl.7 ................................................ H04M 9/08
(52) U.S. Cl. ........................... 379/406.08; 379/406.01; 379/406.05; 379/406.11; 370/289; 370/290
(58) Field of Search ..................... 379/406.01, 406.05, 379/406.08, 406.11, 417; 370/289, 290, 291; 375/350; 381/95, 96, 99, 102

(56) References Cited

U.S. PATENT DOCUMENTS

| | | | | |
|---|---|---|---|---|
| 5,307,405 A | * | 4/1994 | Sih | 379/410 |
| 5,327,496 A | * | 7/1994 | Russell et al. | 380/6 |
| 5,559,881 A | * | 9/1996 | Sih | 379/410 |
| RE35,574 E | * | 7/1997 | Russell et al. | 380/6 |
| 5,646,991 A | * | 7/1997 | Sih | 379/410 |
| 5,661,795 A | * | 8/1997 | Maeda | 379/412 |
| 5,687,229 A | * | 11/1997 | Sih | 379/410 |
| 6,160,886 A | * | 12/2000 | Romesburg et al. | 379/410 |
| 6,181,753 B1 | * | 1/2001 | Takada et al. | 375/346 |
| 6,185,300 B1 | * | 2/2001 | Romesburg | 379/410 |
| 6,236,725 B1 | * | 5/2001 | Takada et al. | 379/406 |
| 6,351,532 B1 | * | 2/2002 | Takada et al. | 379/406.01 |

FOREIGN PATENT DOCUMENTS

| | | | |
|---|---|---|---|
| EP | 0-878-920 A2 | * 11/1998 | ............ H04B/3/23 |
| EP | 0-880-260 A2 | * 11/1998 | ............ H04M/9/08 |
| JP | 61-189735 | 8/1986 | |
| JP | 62-24726 | 2/1987 | |
| JP | 1-126839 | 5/1989 | |
| JP | 2-305231 | 12/1990 | |
| JP | 5-206896 | 8/1993 | |
| JP | 7-193528 | 7/1995 | |
| JP | 7-303066 | 11/1995 | |
| JP | 8-265222 | 10/1996 | |
| JP | 8-288889 | 11/1996 | |

OTHER PUBLICATIONS

Kazuo Ochiai et al. "Echo Canceler with Two Echo Path Models" IEEE Translations on Communications, vol. COMM–25, No. 6, Jun. 1977, pp. 589–595.

* cited by examiner

*Primary Examiner*—Binh Tieu
(74) *Attorney, Agent, or Firm*—Venable LLP; Michael A. Sartori; Robert J. Frank

(57) ABSTRACT

To remove the echo of a received signal from a local input signal, an echo canceler adaptively estimates the transfer characteristics of the echo path. When a double-talk condition is detected, the echo canceler reverses the adaptation process and returns to a set of estimated transfer characteristics that were in use before the double-talk condition began. Imperfect echo cancellation due to incorrect estimation caused by double-talk is thus prevented inexpensively.

8 Claims, 3 Drawing Sheets

ADAPTIVE ECHO CANCELER UNDOING ADAPTATIONS MADE DURING DOUBLE-TALK

BACKGROUND OF THE INVENTION

The present invention relates to an echo canceler useful in telephone, teleconferencing, and videoconferencing systems, more particularly to an improvement in double-talk control in the echo canceler.

An echo canceler estimates the echo that will be produced by a signal received from a communication link and subtracts the estimated echo from a local input signal that will be transmitted on the communication link. Estimation of the echo requires estimation of the acoustic transfer characteristics of the echo path. As the transfer characteristics may change over time, echo cancelers that estimate the characteristics adaptively are frequently used.

This leads to the problem of incorrect estimation of the transfer characteristics in so-called double-talk situations, in which parties at both ends of the communication link talk at once. One known solution to this problem provides the echo canceler with two separate filters, one filter being used for estimation of the transfer characteristics while the other filter is used for echo cancellation. This solution is costly, however, and has other disadvantages that will be pointed out in the detailed description of the invention.

SUMMARY OF THE INVENTION

An object of the present invention is to provide an effective and inexpensive solution to the problem of double-talk in echo cancellation.

The invented echo canceler removes an echo of a received signal from a local input signal by estimating the transfer characteristics of the echo path, calculating an echo replica from the received signal and the estimated transfer characteristics, subtracting the echo replica from the local input signal to generate a residual signal, and modifying the estimated transfer characteristics according to the received signal and the residual signal.

The echo canceler has a memory that stores past samples of the received signal and past samples of the residual signal. The echo canceler also has a double-talk detector that detects a double-talk condition in the local input signal, and a control unit. When the double-talk condition is detected, the control unit undoes recent modifications of the estimated transfer characteristics, using the stored past samples of the received signal and residual signal.

Undoing the recent modifications when double-talk is detected effectively nullifies incorrect modifications made during the double-talk condition. The invented echo canceler is inexpensive because it does not require a second filter.

DETAILED DESCRIPTION OF THE INVENTION

Figure 1:
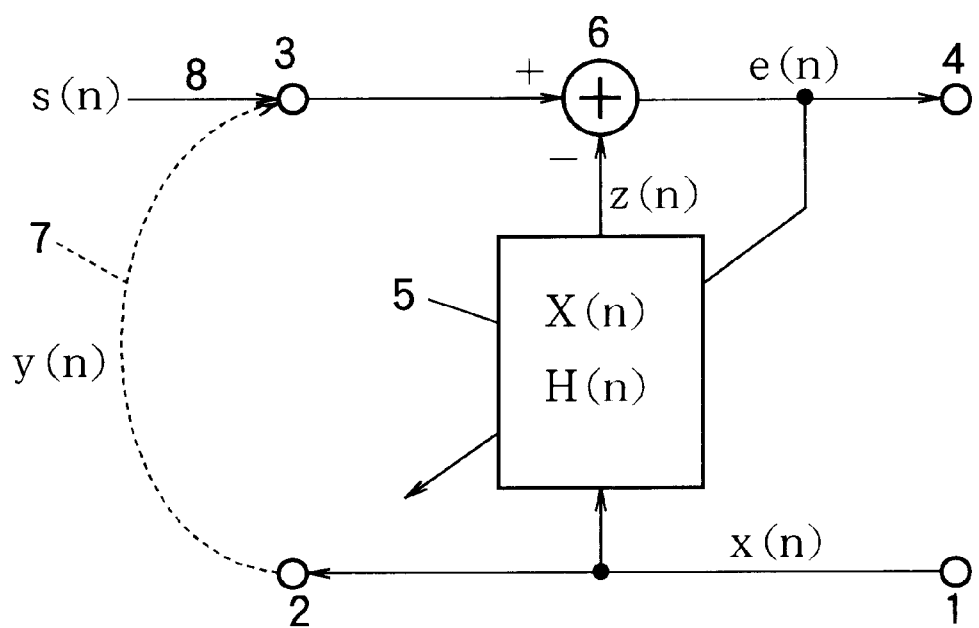
FIG. 1 is a schematic diagram of a prior-art adaptive echo canceler.

An echo canceler embodying the present invention, as well as echo cancelers embodying the prior art, will be described with reference to the attached drawings. Like parts will be indicated by like reference characters.

FIG. 1 illustrates the basic principle of an echo canceler. The illustrated components comprise part of the audio circuits at one end of a telecommunication link used for teleconferencing or videoconferencing, for example. Other components such as digital-to-analog and analog-to-digital converters have been omitted for simplicity.

A signal x(n) received from the telecommunication link at a receiving terminal 1 is reproduced through a loudspeaker 2 and heard by the near-end conference participants. The letter n is a discrete time variable, indicating that x(n) is the n-th sample of the received signal. Some of the reproduced sound reaches a microphone 3, either directly or after being reflected from surfaces such as walls, thus becoming an echo signal y(n). The microphone 3, which the conference participants use to communicate with their distant counterparts, is coupled to the telecommunication link at a transmitting terminal 4. For simplicity, the loudspeaker 2 and microphone 3 will be assumed to have unity electro-acoustic and acousto-electric gain, and the same symbol y(n) will be used to denote both the acoustic echo and the corresponding electrical echo signal output by the microphone 3.

Since the echo y(n) originated at the far end of the telecommunication link, transmission of the echo y(n) back to the far end is unnecessary and annoying. To cancel the unwanted echo y(n), the circuit in FIG. 1 has an adaptive filter 5 that generates an echo replica z(n) by convolving the received signal x(n) with the estimated impulse response of the echo path 7. An adder 6 subtracts the echo replica z(n) from the signal output by the microphone 3, by adding the two's complement of z(n). The resulting residual signal e(n) is supplied to the transmitting terminal 4, and to the adaptive filter 5 itself.

The adaptive filter 5 is a tapped delay line with tap coefficients that estimate the impulse response of the echo path 7. The tap coefficients used at time n can be expressed as a column vector H(n). The adaptive filter 5 stores the most recent sample values of the received signal x(n), which can be expressed as a column vector X(n). After convolving X(n) with H(n), the adaptive filter 5 modifies the tap coefficients H(n) by an adaptation algorithm that attempts to minimize the residual signal e(n). The computations performed by the adaptive filter 5 and adder 6 are expressed by the following equations, in which $\mu$ is a constant referred to as the step gain, M is the number of taps of the adaptive filter 5, and T denotes the row-vector transposition of a column vector.

$$z(n) = H^T(n) \cdot X(n)$$

$$e(n) = y(n) - z(n)$$

$$H(n+1) = H(n) + \frac{\mu \cdot e(n) \cdot X(n)}{X^T(n) \cdot X(n)}$$

where, $$H^T(n) = [h_1(n), h_2(n), \ldots, h_M(n)]$$

$$X^T(n) = [x(n), x(n-1), \ldots, x(n-M+1)]$$

As shown by the third equation above, the adaptation algorithm calculates M correctional values from the M most recent samples X(n) of the received signal and the single most recent sample e(n) of the residual signal, and adds the M correctional values to the M tap coefficients H(n) to obtain new tap coefficients H(n+1). Iteration of this process causes the tap coefficients to converge to the impulse response of the echo path 7, which represents the transfer characteristics of the echo path. Once the tap coefficients have converged, the echo replica z(n) accurately duplicates the echo y (n) If the transfer characteristics of the echo path change, the tap coefficients converge to new values, representing the new transfer characteristics.

When a party at the near end is speaking, a speech signal s(n) 8 is added to the echo y(n) received by the microphone 3, creating a double-talk condition. The above computations then attempt to make the echo replica z(n) equal to the sum of s(n) and y(n). Since s(n) is unrelated to y(n), the coefficients H(n) begin to diverge from the impulse response of the echo path 7. To prevent this divergence, iteration of the computation of H(n+1) from H(n) needs to be suspended when the double-talk condition is detected. If double-talk is detected at a time $n_d$, the adaptive filter 5 should continue to use the fixed tap coefficients $H(n_d)$ until the double-talk condition ends.

Various methods of detecting double-talk are employed. The simplest method monitors the output level of the microphone 3, and detects double-talk when this level exceeds a fixed threshold set between the expected echo level and the expected near-end speech level. In a variation of this method, the threshold is adaptive. The threshold may also be related to the average input level of the received signal x(n). These methods assume that the echo level will be much lower than the near-end and far-end speech levels.

Another double-talk detection method detects variations in the residual signal e (n). When there is no near-end speech, once the tap coefficients H(n) of the adaptive filter 5 converge, the residual signal e(n) becomes extremely small. When a near-end party starts speaking, e (n) quickly becomes much larger, because the coefficients H(n) are unable to converge to values that cancel the speech signal s(n). Thus double-talk can be detected as a sudden increase in the level of the residual signal e(n), without the need for assumptions about the relative levels of the echo and speech signals.

With all of these methods, however, there is a certain lag between the occurrence of double-talk and its detection. During this lag, the tap coefficients H(n) begin to diverge from the impulse response of the echo path 7, as the tap-coefficient adaptation algorithm vainly attempts to cancel the near-end speech signal s(n). By the time double-talk is detected and modification of the tap coefficients H(n) is suspended, the coefficients H(n) have departed from their converged state. After the double-talk condition ends, a certain time elapses before the tap coefficients again converge to the impulse response of the echo path. During this time, and during the preceding double-talk period, the echo signal y(n) fails to be completely canceled.

Figure 2:
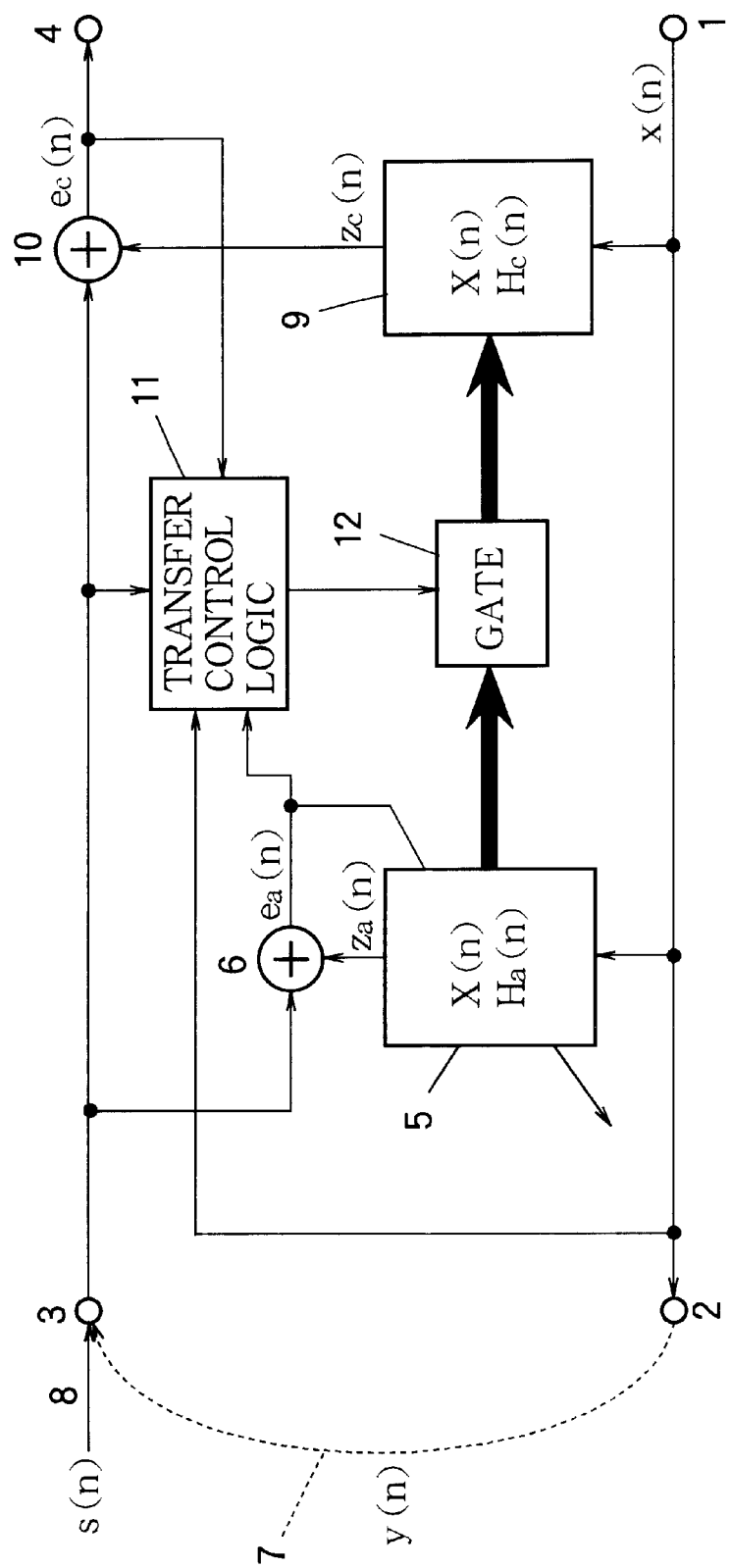
FIG. 2 is a schematic diagram of a prior-art adaptive echo canceler with two filters.

FIG. 2 illustrates the prior-art solution using two filters, as described in IEEE Transactions on Communications, Vol. COM-25, No. 6, June 1977, pp. 589–595. In addition to the elements in shown FIG. 1, the echo canceler in FIG. 2 has a second digital filter 9, which is not adaptive but uses replaceable constant coefficients, coupled to a second adder 10. Both adders 6 and 10 are coupled to the microphone 3, but only the second adder 10 is coupled to the transmitting terminal 4. The subscript 'a' identifies the tap coefficients, echo replica, and residual signal of the adaptive filter 5. The subscript 'c' identifies the tap coefficients, echo replica, and residual signal of the constant-coefficient second digital filter 9. The computations performed by the second digital filter 9 and second adder 10 are expressed by the following equations.

$$z_c(n) = H_c^T(n) \cdot X(n)$$

$$e_c(n) = y(n) - z_c(n)$$

During non-double-talk periods, the received signal x(n), the microphone output y(n), and the residual signals $e_c(n)$ and $e_a(n)$ are monitored by transfer control logic 11. When the transfer control logic 11 determines from these signals that the adaptive filter 5 has converged to a better set of tap coefficients $H_a$ (n) than the tap coefficients $H_c$ (n) being used by the second digital filter 9, the transfer control logic 11 controls a gate 12, which transfers the tap coefficients $H_a$ (n) from the adaptive filter 5 to the second digital filter 9. The second digital filter 9 uses the transferred coefficients as its tap coefficients $H_c$ (n), until the next such transfer occurs.

During double-talk periods, when the microphone output becomes y (n)+s (n), the tap coefficients $H_a$ (n) of the adaptive filter 5 may diverge severely, but they are not used; the second digital filter 9 continues to cancel the echo signal y(n) with coefficients $H_c$ (n) received before the double-talk condition began. If the transfer characteristics of the echo path 7 do not change during the double-talk period, the echo will be canceled correctly. After double-talk ends, once the adaptive filter coefficients $H_a$ (n) have converged again, they can be transferred to the second digital filter 9 as necessary to adapt to changes in the transfer characteristics of the echo path 7.

The echo canceler in FIG. 2 is costly because each filter has a large number of taps. In conferencing systems that reproduce audio frequencies up to seven kilohertz (7 kHz) by using a 16-kHz sampling rate, for example, if the echo duration is two hundred fifty milliseconds (250 ms), then each filter has four thousand taps. The additional filter 9 thus requires additional memory space for storing four thousand tap coefficients, not to mention the additional arithmetic processing resources needed for convolving these coefficients with the received signal. Circuit resources are also needed for transferring coefficients from one filter to the other, further increasing the number of components and cost of the echo canceler.

Another disadvantage of the echo canceler in FIG. 2 is that it does not respond as quickly as the echo canceler in FIG. 1 to changes in the echo path 7 when double-talk is absent. This is because the transfer control logic 11 needs extra time to decide when to transfer the coefficients $H_a$ (n) from the adaptive filter 5 to the second digital filter 9, and the transfer itself also takes extra time.

Figure 3:
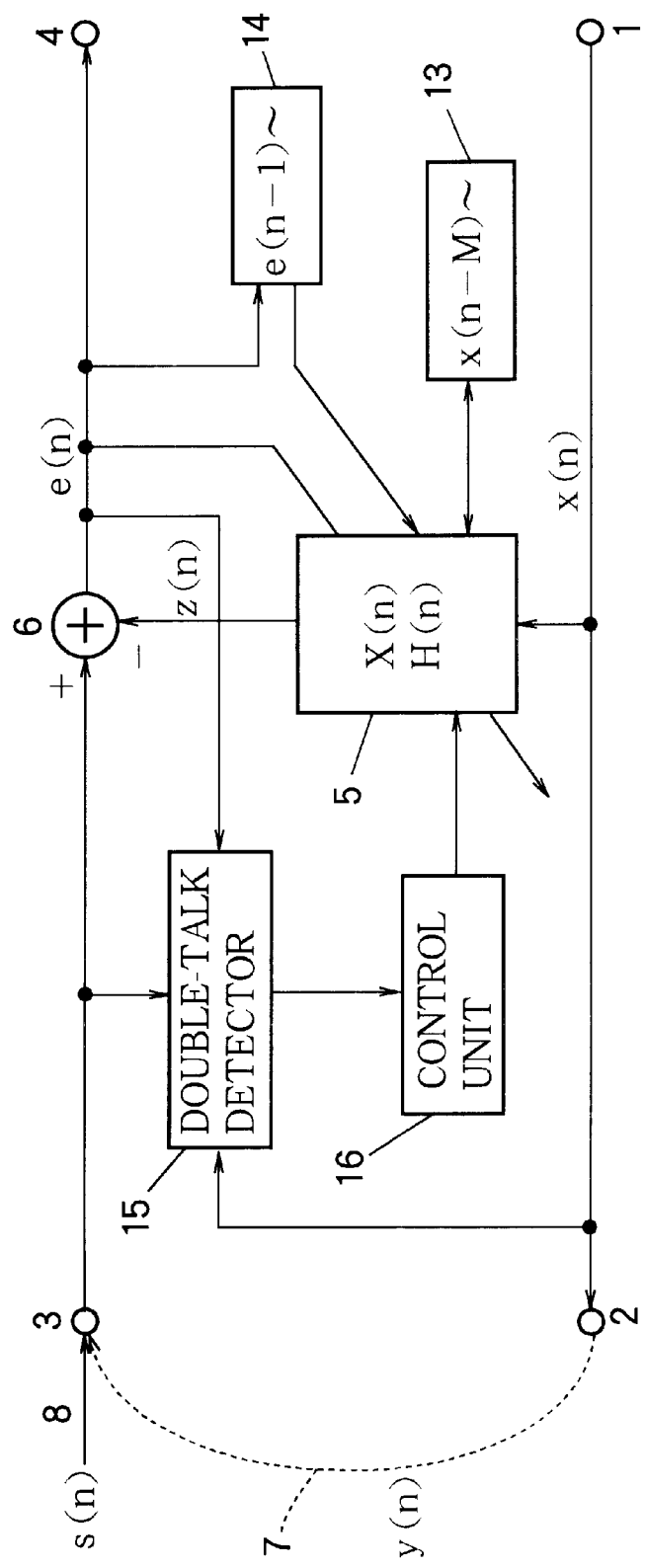
FIG. 3 is a schematic diagram of an adaptive echo canceler illustrating the present invention.

Referring now to FIG. 3, an echo canceler embodying the present invention has an adaptive filter 5 as described above, a pair of memories 13, 14, a double-talk detector 15, and a control unit 16. The first memory 13 stores at least L past sample values of the received signal, from x(n−M) to x(n−M−L+1), where L is a positive integer equal to the number of sample periods required for double-talk detection, plus a certain safety margin. The second memory 14 stores at least L past values of the residual signal, from e(n−1) to e(n−L). The samples stored in the memories 13, 14 are previous to the samples of the received signal X(n) and residual signal e(n) used by the adaptive filter 5.

The double-talk detector 15 detects the double-talk condition by using, for example, any of the conventional methods mentioned above. The double-talk detector may use the received signal x(n), the microphone output s(n)+y (n), and the residual signal e(n), as shown, but does not have to - use all of these signals. The precise meaning of the double-talk condition depends on the detection method employed, but basically, double-talk refers to any condition in which near-end speech is present. The double-talk detector 15 sends the control unit 16 a signal indicating the presence or absence of the double-talk condition.

When notified of double-talk, the control unit 16 undoes the L most recent modifications of the tap coefficients H(n) by reversing the adaptation algorithm of the adaptive filter 5, causing the adaptive filter 5 to return to the tap coefficients H (n−L) it was using L sample periods before double-talk was detected. Since the value of L is larger than the number of sample periods needed by the double-talk detector 15 to detect double-talk, the tap coefficients H(n−L) will in general be coefficients that had converged accurately to the impulse response of the echo path 7. After restoring the adaptive filter 5 to these tap coefficients H(n−L), the control unit 16 disables further modification of the tap coefficients until the double-talk condition ends.

The equation for the adaptation algorithm, given above, can be rewritten in the following form.

$$H(n) = H(n-1) + \frac{\mu \cdot e(n-1) \cdot X(n-1)}{X^T(n-1) \cdot X(n-1)}$$

The adaptation algorithm is reversed by calculating H (n−1) from H (n) as shown below. The vector X(n−1) comprises the values x(n−1) to x(n−M+1) stored in the adaptive filter 5, and the value x(n−M) stored in the first memory 13. The value e (n−1) is stored in the second memory 14.

$$H(n-1) = H(n) - \frac{\mu \cdot e(n-1) \cdot X(n-1)}{X^T(n-1) \cdot X(n-1)}$$

Iteration of this process, using the other values stored in memories 13 and 14, yields the tap coefficients H(n−L) as follows.

$$H(n-L) = H(n) - \sum_{k=1}^{L} \frac{\mu \cdot e(n-k) \cdot X(n-k)}{X^T(n-k) \cdot X(n-k)}$$

The calculation of H (n−L) takes L sample periods, if the reversed adaptation algorithm is executed at the same rate as the normal adaptation algorithm, or less, if the reversed adaptation algorithm can be executed at a faster rate. If the execution of the reversed adaptation algorithm takes N+1 sample periods, where N is a non-negative integer, then the memories 13, 14 should have a capacity of L+N samples each. Alternatively, the memories 13, 14 can store L samples each, storage space for N extra samples of the received signal x(n) can be provided in the adaptive filter 5, and the updating of the memories 13, 14 can be temporarily halted while the reverse adaptation algorithm is being executed.

The time required for double-talk detection, although varying depending on the method employed, is in the general vicinity of ten milliseconds (10 ms), which is much shorter than the length of time covered by the tap coefficients in the adaptive filter. The total extra memory capacity required by the present invention, including both memories 13 and 14, is therefore much less than the extra capacity needed to store the tap coefficients $H_c$ (n) for the second digital filter 9 in the prior-art solution in FIG. 2.

In the invented echo canceler, imperfect echo cancellation can be expected during the double-talk detection lag and while the reverse adaptation algorithm is being executed, but the total duration of this time is so short that the non-canceled echo is not annoying.

When double-talk is not present, the invented echo canceler operates in the same way as the conventional echo canceler shown in FIG. 1, adapting quickly to changes in the echo path 7, without the delays caused by the transfer of tap coefficients in the echo canceler in FIG. 2.

The reverse adaptation algorithm closely resembles the normal adaptation algorithm, merely subtracting the correctional values that were added previously by the adaptation algorithm. Since the two algorithms never have to be executed at the same time, the reverse adaptation algorithm can be executed by the same processing resources as used for the normal adaptation algorithm. The control process carried out by the control unit 16 is simple, and the double-talk detection process carried out by the double-talk detector 15 is the same as the conventional process. The processing requirements of the invented echo canceler are thus comparable to those of the conventional echo canceler in FIG. 1, and are much less than those of the echo canceler in FIG. 2.

The invented echo canceler in FIG. 3 provides a solution to the double-talk problem that is comparable in effectiveness to the prior-art solution in FIG. 2, at a cost only slightly higher than the cost of the conventional echo canceler in FIG. 1.

Memories 13 and 14 were shown as separate in FIG. 3, but these memories may be separate areas in a single memory device. The first memory 13 may be combined with a memory that stores samples of the received signal in the adaptive filter 5.

Those skilled in the art will recognize that further variations are possible within the scope claimed below.

What is claimed is:

1. An echo canceler that removes an echo of a received signal from a local input signal by subtracting an echo replica from the local input signal to generate a residual signal, comprising:

an adaptive filter using a plurality of recent samples of the received signal and estimated transfer characteristics of a path of the echo to calculate the echo replica, and using the recent samples of the received signal and a recent sample of the residual signal to modify the estimated transfer characteristics;

a double-talk detector detecting a double-talk condition in the local input signal;

a memory storing samples of the received signal previous to the samples used by the adaptive filter, and samples of the residual signal previous to the sample used by the adaptive filter; and a control unit coupled to the adaptive filter, the double-talk detector, and the memory, using the samples stored in the memory to undo recent modifications of the estimated transfer characteristics when the double-talk condition is detected, thereby restoring the adaptive filter to the estimated transfer characteristics that were in use before the double-talk condition occurred.

2. The echo canceler of claim 1, wherein after undoing the recent modifications, the control unit prevents further modifications of the estimated transfer characteristics until the double-talk condition ends.

3. The echo canceler of claim 1, wherein:

the adaptive filter modifies the estimated transfer characteristics by calculating correctional values from the recent samples of the received signal and the recent sample of the residual signal, and adding the correctional values to the estimated transfer characteristics; and the control unit undoes the recent modifications by having the adaptive filter recalculate the correctional values, using the samples stored in the memory, and subtract the recalculated correctional values from the estimated transfer characteristics.

4. The echo canceler of claim 1, wherein the estimated transfer characteristics are tap coefficients estimating an impulse response of the path of the echo.

5. A method of controlling an echo canceler that removes an echo of a received signal from a local input signal by estimating transfer characteristics of a path of the echo, calculating an echo replica from the received signal and the estimated transfer characteristics, subtracting the echo replica from the local input signal to generate a residual signal, and modifying the estimated transfer characteristics according to the received signal and the residual signal, comprising the steps of:

storing past samples of the received signal;

storing past samples of the residual signal;

detecting a double-talk condition in the local input signal; and undoing recent modifications of the estimated transfer characteristics when the double-talk condition is detected, using the stored past samples of the received signal and the stored past samples of the residual signal, thereby returning the estimated transfer characteristics to a state before the double-talk condition occurred.

6. The method of claim 5, further comprising the step of:

preventing further modifications of the estimated transfer characteristics after the recent modifications have been undone, until the double-talk condition ends.

7. The method of claim 5, wherein the estimated transfer characteristics are modified by addition of correctional values calculated from recent samples of the received signal and a recent sample of the residual signal, and said step of undoing further comprises the steps of:

recalculating the correctional values, using the stored past samples of the received signal and the stored past samples of the residual signal; and subtracting the recalculated correctional values from the estimated transfer characteristics.

8. The method of claim 5, wherein the estimated transfer characteristics are tap coefficients estimating an impulse response of the path of the echo.

* * * * *